United States Patent [19]
Po Wo Cheung

[11] Patent Number: 5,349,898
[45] Date of Patent: Sep. 27, 1994

[54] VEGETABLE STEAMER ARRANGEMENT

[75] Inventor: Paul Po Wo Cheung, Hong Kong, Hong Kong

[73] Assignee: Maxpat Trading & Marketing (Far East) Limited, Hong Kong, Hong Kong

[21] Appl. No.: 922,542

[22] Filed: Jul. 30, 1992

[30] Foreign Application Priority Data

Aug. 1, 1991 [GB] United Kingdom ............. 9116669

[51] Int. Cl.⁵ .................. A47J 27/04; A47J 27/12; A47J 43/24
[52] U.S. Cl. .................................... 99/417; 99/415; 99/418; 99/450; 126/369
[58] Field of Search ................. 99/403, 410–415, 99/416–418, 450; 126/369, 369.1, 362.2, 373, 374, 388, 389

[56] References Cited

U.S. PATENT DOCUMENTS

| 179,292 | 6/1876 | Fuller | 126/369.2 |
|---|---|---|---|
| 204,353 | 5/1878 | McClure | 126/369 |
| 227,903 | 5/1880 | King | 126/369.2 |
| 467,480 | 1/1892 | Hawkins | 126/369 |
| 618,496 | 1/1899 | Cox | 126/369 |
| 797,660 | 8/1905 | Brooks | 99/415 |
| 1,390,908 | 9/1921 | Jobe | 126/369 |
| 1,445,788 | 2/1923 | Millican | 99/418 |
| 2,662,965 | 12/1953 | Becker | 99/417 |
| 2,667,117 | 1/1954 | Millard . | |
| 4,138,939 | 2/1979 | Feld . | |
| 4,224,864 | 9/1980 | Wendell | 99/416 |
| 5,069,198 | 12/1991 | Henderson | 126/377 |

FOREIGN PATENT DOCUMENTS

| 509647 | 11/1920 | France . | |
|---|---|---|---|
| 544339 | 1/1956 | Netherlands | 126/369 |

Primary Examiner—Timothy F. Simone
Attorney, Agent, or Firm—Townsend and Townsend Khourie and Crew

[57] ABSTRACT

A support device for a pair of vegetable steamers comprising a pillar (32,34) having at one end a support (38) for the base of an upper vegetable steamer (10a) and at its other end having means (60) to attach to a lower vegetable steamer (10b) so that the pillar is upstanding from the base of that lower vegetable steamer, the other end of the pillar thus extending above the lower vegetable steamer to support the upper vegetable steamer above the lower vegetable steamer in a vertical manner.

16 Claims, 6 Drawing Sheets

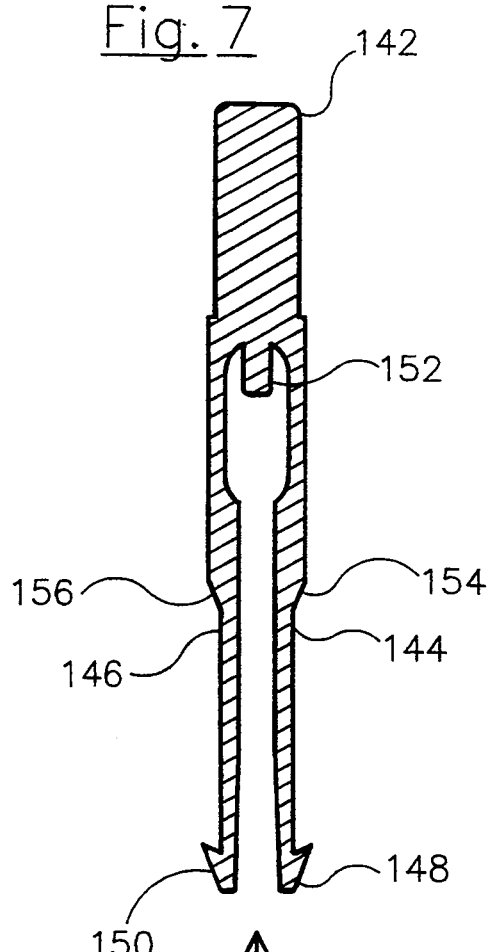
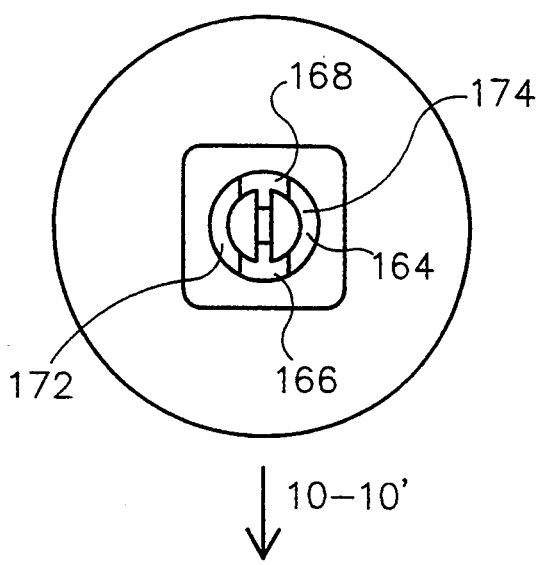
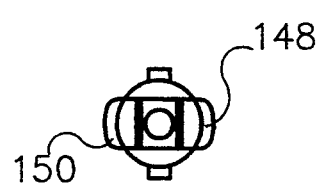
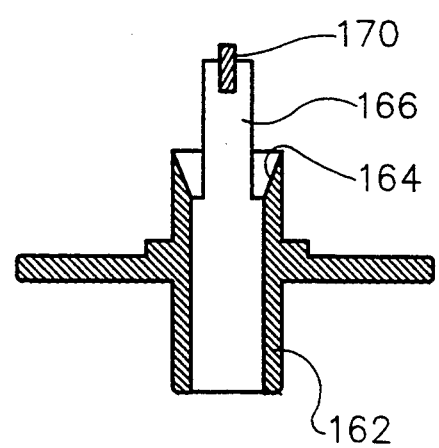

5,349,898

VEGETABLE STEAMER ARRANGEMENT

BACKGROUND OF THE INVENTION

This invention relates to a vegetable steamer arrangement and in particular to a device to enable two or more of these steamers to be stacked one above another during cooking.

Vegetable steamers are well known and these enable vegetables, and often other types of food such as fish or meat, to be cooked in the steam of a cooking pot rather than by immersing the food in a boiling liquid. Such steamers generally comprise a perforated base and a number of perforated interleaved hinged leaves surrounding the base which can be opened to gain access to the food and folded over to enclose the food during cooking. The steamers can be made of a metal like stainless steel, or of plastics material as for example shown in United Kingdom Design Registration No. 1 048 465.

Generally only one such vegetable steamer is placed in a cooking pot and the vegetable steamer usually has feet or the like to enable it to stand on the base of the pot slightly above boiling water so that the food is cooked purely by being subject to the steam. It is an object to the present invention, however, to provide an arrangement whereby two or more such vegetable steamers can be safely and conveniently stacked one upon the other during cooking.

According to the invention in one aspect there is provided a combination of a support device and a first and second vegetable steamer, wherein the support device enables one vegetable steamer to be stacked upon another. The support device comprises a pillar having at one end a support for the base of an upper steamer and, at its other end, a means to attach the pillar to a lower steamer, so that the pillar is upstanding from the base of the second steamer and extends from the second vegetable steamer to support the first vegetable steamer above the second and wherein the pillar is of adjustable length.

Such an arrangement is very simple and the support device can be made of synthetic plastics material so that two or more synthetic plastics material steamers can be supported one above the other in a microwave oven if desired as an alternative to being supported in a cooking pot.

Also according to the invention in another aspect there is provided the combination of a pair of vegetable steamers together with a support device, the support device comprising a pillar having at one end a support for the base of an upper vegetable steamer and, at its other end, means to attach it to a lower vegetable steamer so that the pillar is upstanding from the base of that lower vegetable steamer, the said one end thus extending above the lower vegetable steamer to support the upper vegetable steamer above the lower and wherein the first end of the pillar has screw threaded means and the upper vegetable steamer has a screw threaded spigot, receivable by the screw threaded means of the upper vegetable steamer to attach the pillar thereto. The second end of the pillar has a screw threaded spigot and the base of the second vegetable steamer is equipped with a corresponding screw threaded opening for engagement with the spigot of the pillar.

Also according to the invention in another aspect there is provided a combination of a support device and an upper and lower vegetable steamer, each steamer having a base. The support device comprises a pillar having a first and a second end, a support for the base of the upper vegetable steamer at one end of the pillar and means to attach the support device to the lower vegetable steamer being provided at the other end of the pillar so that the pillar is upstanding from the base of the lower vegetable steamer, and extends from the lower steamer to support the upper vegetable steamer above the lower one. The end of the pillar that supports the upper vegetable steamer is shaped to provide a platform to support the base of the upper vegetable steamer.

Another aspect of the invention provides for a combination of a support device and an upper and lower vegetable steamer. The support device encompasses a pillar which extends from the lower vegetable steamer to support the upper vegetable steamer by attaching to the base of the upper steamer. The support device further comprises releasable engagement means for connecting the upper vegetable steamer to the pillar of the support device.

It is preferred that the pillar be of adjustable length. In a simple embodiment this can be achieved by providing the pillar in two parts, one of which has an external screw threading and the other of which is hollow and has an internal screw threading to receive the external screw threading on the first part, so that the length of the pillar can be adjusted by telescoping one part into or out of the other. To ensure that the two screw threading engage over a sufficient length to provide stability, it is preferred that stop means be provided to limit the extent by which they can be unscrewed relative one another. These stop means can comprise an outward projection on the part having the external screw threading and a corresponding inward projecting on the other part which come into engagement to limit and block further unscrewing of the two parts relative one another.

Usually vegetable steamers are provided with a removable central pillar with a form of handle at the top which can be temporarily screwed into the base to enable the vegetable steamer to be picked up and placed into a cooking pot. Such a pillar usually consists of a metal or synthetic plastics material rod having at its lower end a screw threaded spigot which can be temporarily screwed into a threaded opening in the base. According to an advantageous embodiment of the invention therefore this screw threaded spigot is used to attach the support device used according to the invention and the said other or lower end of the pillar has a screw threaded spigot which can be temporarily fixed into the screw threaded opening in the base of the lower vegetable steamer.

The said one or upper end of the pillar forming the support device is preferably shaped to provide a platform on which the base of an upper vegetable steamer can rest and to this end it can be mushroom-shaped with a flat top on which the base of upper vegetable steamer can sit and be supported. To help centre the upper vegetable steamer, that upper flat top can have a central depression in which a central downward projection from the base of the upper vegetable steamer can fit. Such a projection is normally present and houses the screw threaded opening.

In a preferred embodiment of the invention an upper handle member is joined through the centre of the base of the upper steamer to the top of the pillar to secure the upper steamer in place. In addition the upper handle member can be used to lift the combined assembly of the two steamers and the support device to place it into or remove it from a cooking pot.

BRIEF DESCRIPTION OF THE DRAWINGS

The invention will now be described, by way of example, with reference to the accompanying drawings, in which:

FIG. 7 is a cross-sectional view of the connector member of FIG. 6.

FIG. 8 is a view in the direction of arrow 8-8' of FIG. 7.

FIG. 9 is a cross-sectional view of a further component of the actuator of FIG. 6.

FIG. 10 is a view in the direction of arrow 10-10' of FIG. 9.

DESCRIPTION OF THE PREFERRED EMBODIMENTS

Figure 1:
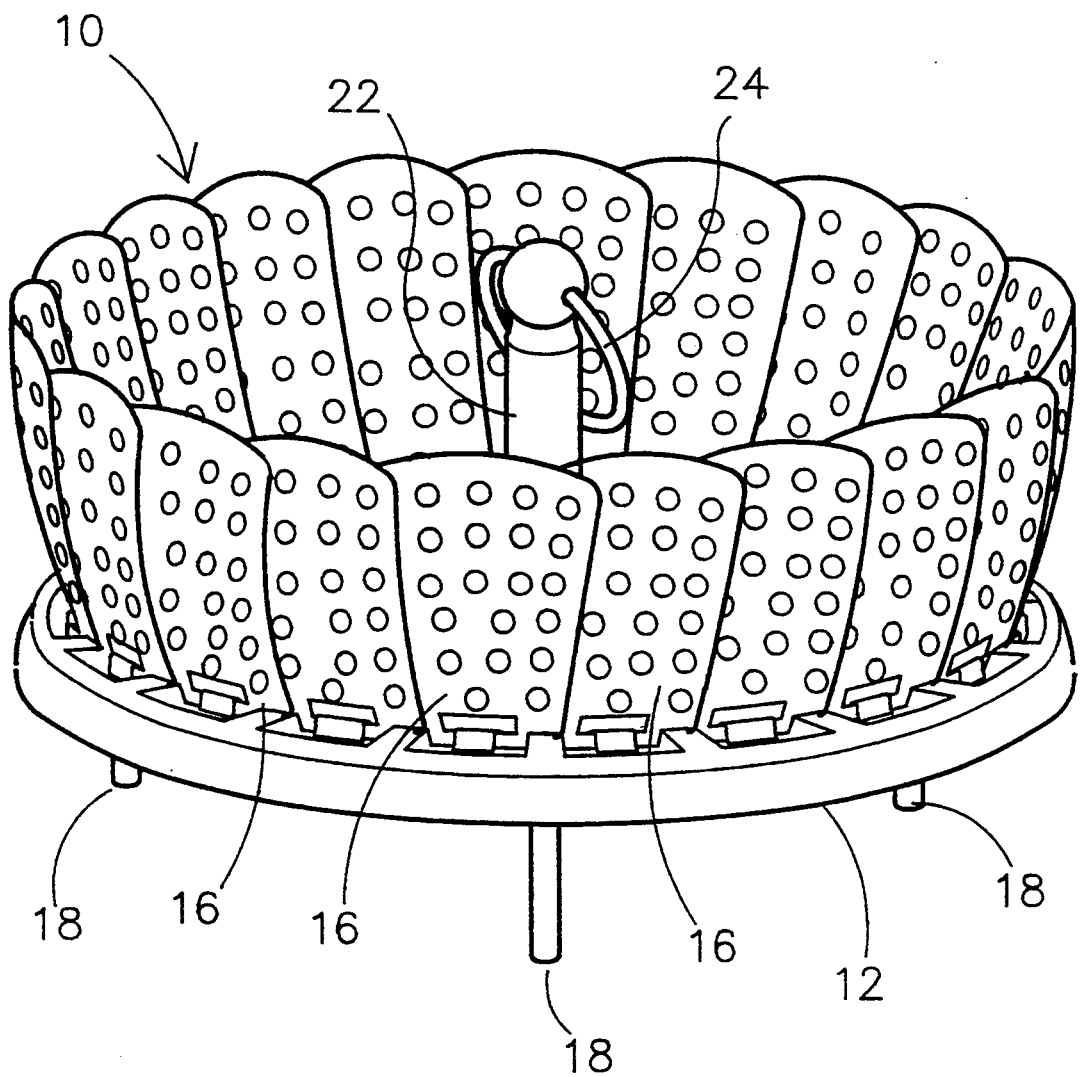
FIG. 1 is a perspective view of a vegetable steamer.

As shown in FIG. 1 of the drawings, a conventional vegetable steamer 10 comprises a circular metal base 12 of for example stainless steel. This is perforated with a large number of holes (not shown) to allow steam to pass through. Around its edges there are hinged a large number of individual interleaved metal leaves 16. These again are perforated for the same reason and for simplicity only a few perforations in some leaves are shown. The leaves can be hinged between an open position in which food can be placed in the steamer or removed therefrom after cooking and a closed position where the steamer forms a kind of basket enclosing the food during cooking.

The base is provided with three feet 18 which enable it to stand in a cooking pot or the like so as to support the food above the level of boiling water in the cooking pot.

Figure 3:
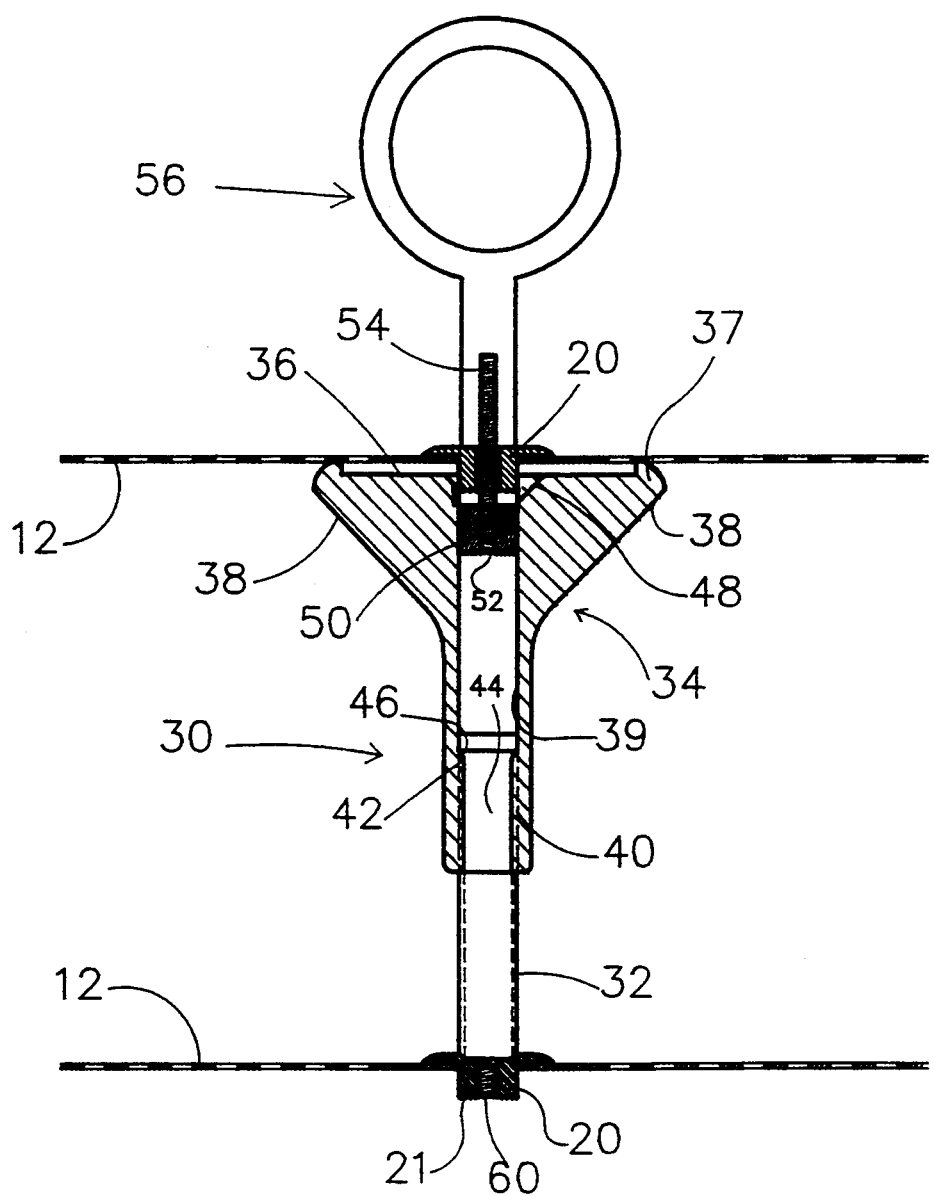
FIG. 3 is an upright sectional detail through the support device and parts of the steamers.

In the centre of the base and as best shown in FIG. 3 is riveted a spigot 20. This has a bore 21 with an internal screw thread. A metal stem 22 whose lower end is threaded can be engaged in that spigot and, as seen in FIG. 1, that stem has as its top a hinged ring 24. When the stem is positioned as shown in FIG. 1, the user can pick up the vegetable steamer with the food it contains by grasping the ring and can then place it in a cooking pot of boiling water or equally remove the vegetable steamer after cooking. During cooking the stem 22 can be unscrewed and removed although this is not essential.

In order to stack one vegetable steamer 10a above another 10b in accordance with the invention, and as shown in FIG. 3, a supporting device 30 is attached to the lower steamer 10b in place of the metal stem 22.

Figure 2:
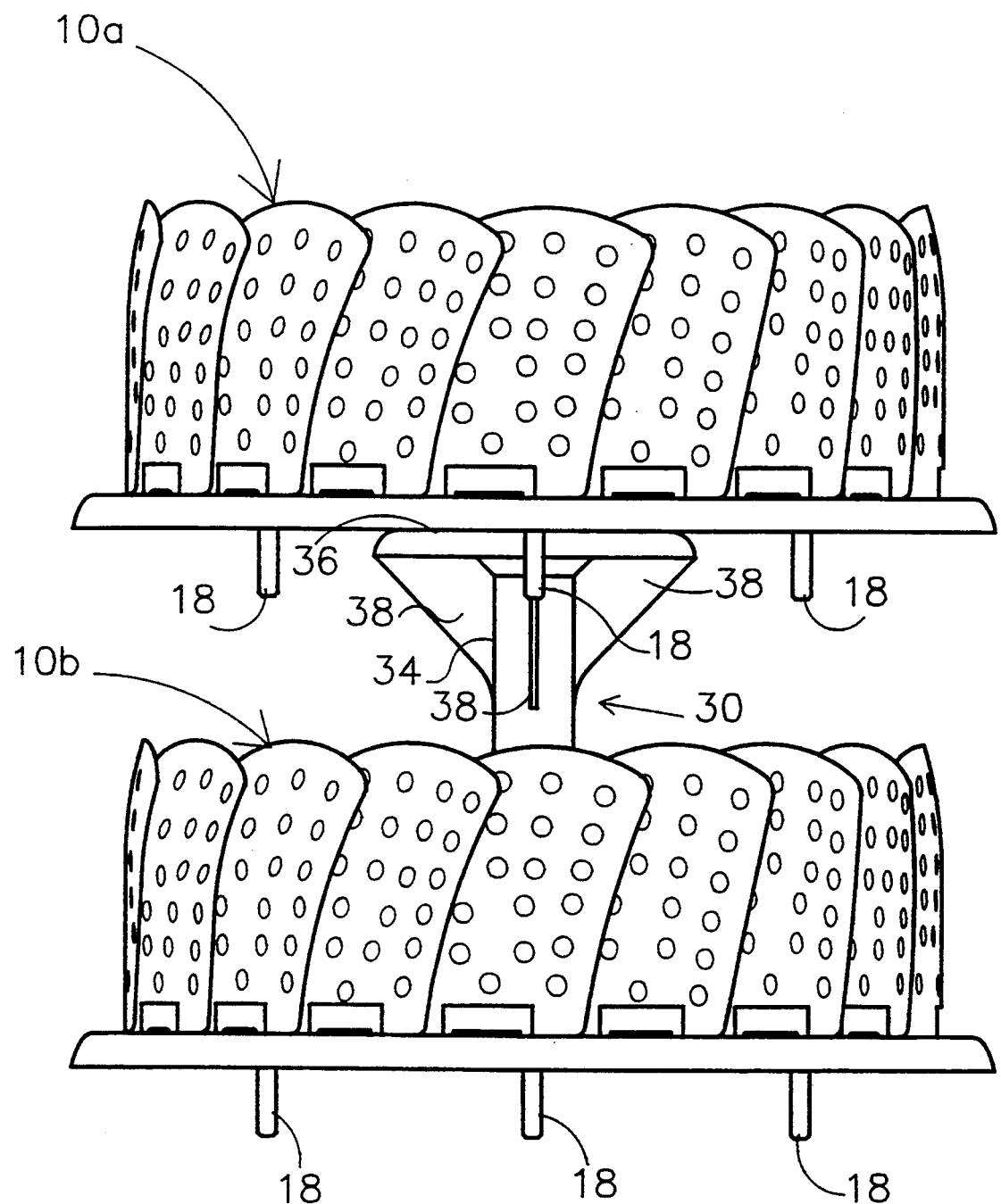
FIG. 2 is a side view showing two vegetable steamers supported one above the other by a support device according to the invention.

As best seen in FIGS. 2 and 3 this device comprises a lower upstanding rod 32 provided with an external screw thread and an upper mushroom shaped support 34. The latter has a flattened circular top 36 with an upstanding surrounding rim 37 on which the base 12 of an upper steamer sits. A number of radial re-enforcing flanges 38 are provided.

Figure 4:
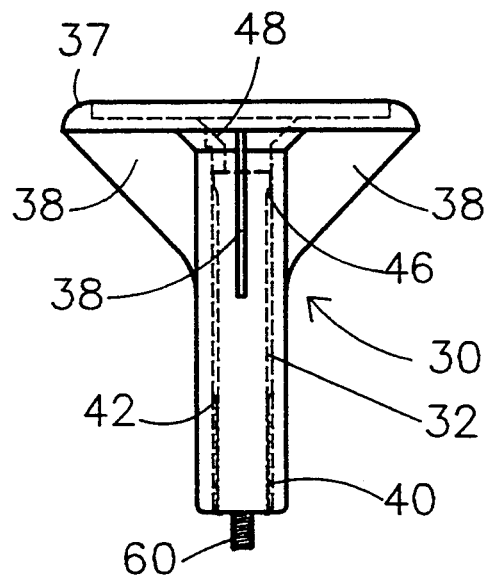
FIG. 4 is a side view of the support device.
Figure 5:
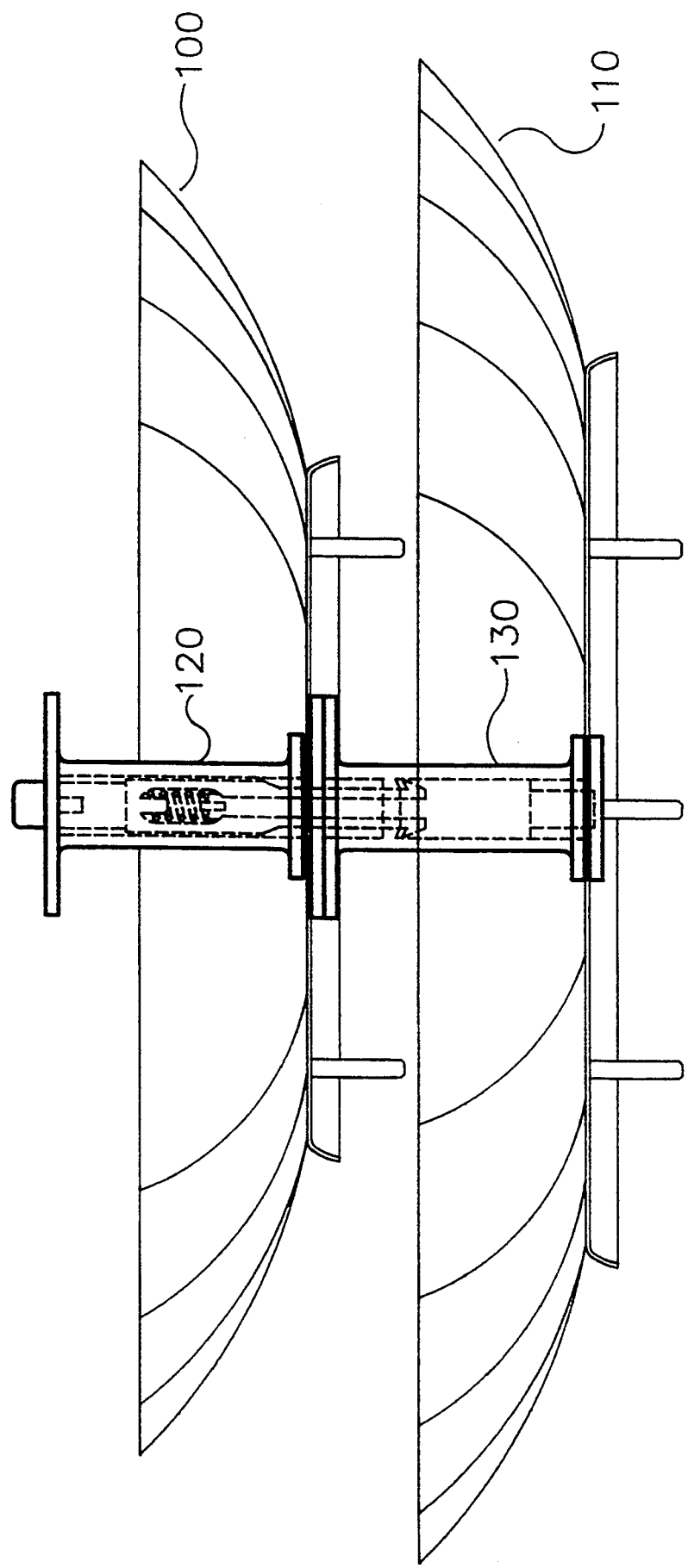
FIG. 5 is a side view of a second embodiment of the invention.

The support 34 also has a central bore 39 and at its lower end is a flange 40 which has an internal screw thread into which the threaded rod 32 can be screwed. The flange 40 is slightly smaller in diameter than the bore 39 and is joined thereto by an inclined ledge 42. The upper end of the rod 32 has a corresponding enlargement 44 with an inclined ledge 46 such that the ledges 42 and 46 will abut when the maximum desired limit of screwing of the rod 32 relative the support 34 is reached. This ensures stability of the device 30. Subject to that, however, the overall height of the device 30 can be adjusted as desired between the minimum shown in FIG. 4 and the maximum shown in FIG. 3 simply by rotating the rod 32 relative the support 34.

At the centre of the top 36 is provided a frustoconical recess 48 of a size into which the spigot 20 of an upper steamer 10a can fit to locate that steamer in place. A central insert 50 is fixed in the top of the bore 39 to close this. In addition this has a central threaded bore 52 which is arranged to receive a threaded pin 54 extending down from a handle 56 through the bore 21 in the spigot 20 of the upper steamer 10a. The pin is of a smaller diameter than the bore 21. In this way the upper steamer 10a is secured in place to the top of the support device 30.

The rod 32 has at its lower end a metal threaded pin 60 which can fit into the threaded bore 21 in the spigot 20 of the lower steamer 10b in place of the stem 22.

The overall length of the device can be adjusted by threading the rod 32 into or out of the upper support 34 so as to enable the device to support the second steamer 10a above the first 10b without the second steamer 10a resting on the closed leaves of the first steamer 10a and also without taking up excessive height.

The thus assembled steamers 10a and 10b can be readily lifted and placed in or removed from a cooking pot by simply grasping the handle.

It is also possible according to the invention to provide a second device 30 so that a third or subsequent steamer can be stacked one above the other.

Although the steamers shown in the drawings are of metal they could just as easily be made of synthetic plastics material.

FIGS. 5–10 show a second embodiment of the invention which includes first and second steamers 100, 110 of similar construction to that shown in FIGS. 1 and 2. Each steamer 100, 110 is provided with a pillar 120, 130. The pillar 120 provides a handle for grasping the steamer 100, or the steamer assembly 100, 110 when connected. The pillar 130 provides a support to enable steamer 100 to be stacked on steamer 110 in the manner of the first embodiment of the invention.

This embodiment, however, includes a means for automatically engaging and releasing the steamers 100, 110 in a simple manner.

Figure 6:
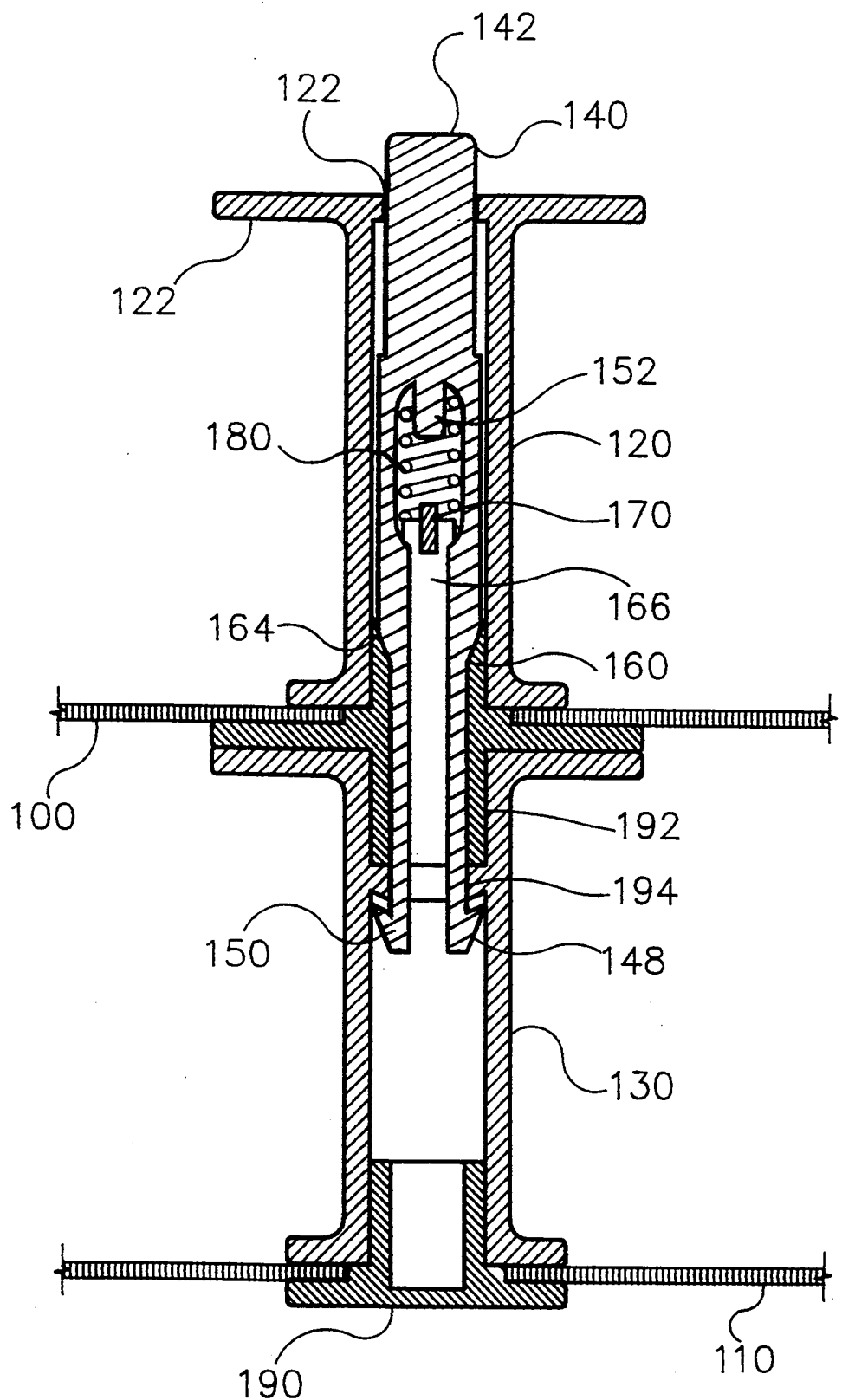
FIG. 6 is a cross-sectional view of the support device of FIG. 5.

As shown in FIG. 6, which is a cross-sectional view of the pillars 120, 130 when connected, pillar 120 includes a steamer engagement assembly comprising a first member 140, shown in FIGS. 7 and 8 and a second member 150 shown in FIGS. 9 and 10.

The member 140 comprises a push button 142 which projects through an opening 122 formed in the upstanding end of pillar 120. The push button 142 is connected to two resilient limbs 144, 146 which are provided with inclined surfaces 154, 156 and barbed or catch-shaped ends 148, 150. The limbs 144, 146 are generally rectangular in cross-section as shown in FIG. 8. A projection 152 protrudes between the limbs 144, 146.

Member 160 has a cylindrical sleeve 162 provided at one end with a radially bevelled edge 164. Two axially extending arms 166, 168 protrude from the sleeve 162 and include a bridge member 170 connected between the arms.

When assembled, limbs 144, 146 lie axially in the gaps 172, 174 between the arms 166, 168. The bridge 170 faces projection 152 and, as shown in FIG. 6, a spring biasing the member 140 away from member 160 is held therebetween.

Pillar 130 has a cylindrical bore 192 provided with a throat 194 of narrower diameter.

In use, member 160 is affixed, e.g. by adhesive, to pillar 120 in the position shown in FIG. 6 with the steamer 100 being captured at its base portion between these elements.

Pillar 130 is attached to lower steamer 110, with the base of the steamer 110 being captured between pillar 130 and a stop member 190.

If it is desired to connect the two steamers together, limbs 144, 146 are introduced into bore 192 in pillar 130. Upon engagement of the legs 144, 146 with the throat 194, these deform inwardly, snapping back to the position shown in FIG. 6 after the throat 194 is cleared. Engagement of the limbs 144, 146 with the side of the throat 194 locks the steamers together with cylindrical portion 163 of member 160 locating in bore 192.

When it is desired to release the steamers, a circular handle portion 122 of pillar 120 is grasped and the button 142 depressed. This causes member 140 to be depressed downwardly and for inclined surfaces 154, 156 to mate against bevelled surface 164 of member 160 thus causing the legs 144, 146 to deform radially inwardly, so that catches 148, 150 may be removed from throat 194.

I claim:

1. In combination a support device and first and second vegetable steamers, each of said steamers having a base, the support device comprising a pillar formed in two parts which are telescopically connected, one of the parts having an external screw threading and the other part being hollow and having an internal screw threading to receive the external screw threading of the first part, the pillar having first and second ends, a support for the base of the first vegetable steamer being provided at said first end of said pillar and means to attach the support device to the second vegetable steamer being provided at said second end so that the pillar is upstanding from the base of the second vegetable steamer and extends from the second vegetable steamer above to support the first vegetable steamer above the second vegetable steamer, wherein the pillar is of adjustable length.

2. A combination as claimed in claim 1 further comprising stop means to limit the extent of relative movement of the parts.

3. A combination as claimed in claim 2 wherein the stop means comprises an outward projection on the part having the external screw threading and a corresponding inward projection on the other part, the projections coming into engagement to limit and block relative movement of the parts.

4. In combination a support device and first and second vegetable steamers, each of said steamers having a base, the support device comprising a pillar having first and second ends, a support for the base of the first vegetable steamer being provided at said first end of said pillar and means to attach the support device to the second vegetable steamer being provided at said second end so that the pillar is upstanding from the base of the second vegetable steamer and extends from the second vegetable steamer above to support the first vegetable steamer above the second vegetable steamer, wherein said first end of said pillar has screw threaded means and the first vegetable steamer has a screw threaded spigot, receivable by said screw threaded means to attach the pillar thereto, said second end of said pillar having a screw threaded spigot and the base of the second vegetable steamer having a corresponding screw threaded opening for engagement with said screw threaded spigot of the pillar.

5. A combination as claimed in claim 4 wherein the pillar is formed in two parts which are telescopically connected.

6. In combination a support device and first and second vegetable steamers, each of said steamers having a base, the support device comprising a pillar having first and second ends, the pillar being provided with a bore having a ledge and a catch member being connected to the first vegetable steamer, the catch member engaging the ledge in snap-fit engagement to connect the first and second vegetable steamers together, a support for the base of the first vegetable steamers being provided at said first end of said pillar and means to attach the support device to the second vegetable steamer being provided at said second end of said pillar so that the pillar is upstanding from the base of the second vegetable steamer and extends from the second vegetable steamer above to support the first vegetable steamer above the second vegetable steamer, wherein the first end of said pillar is shaped to provide a platform to support said base of the first vegetable steamer.

7. A combination as claimed in claim 6 wherein the pillar is formed in two parts which are telescopically connected.

8. A combination as claimed in claim 6 wherein the platform is provided with location means for receiving the first vegetable steamer.

9. In combination a support device and first and second vegetable steamers, each of said steamers having a base, the support device comprising a pillar having first and second ends, the pillar being provided with a bore having a ledge and a catch member being connected to the first vegetable steamer, the catch member engaging the ledge in snap-fit engagement to connect the first and second vegetable steamers together, a support for the base of the first vegetable steamer being provided at said first end of said pillar and means to attach the support device to the second vegetable steamer being provided at said second end of said pillar so that the pillar is upstanding from the base of the second vegetable steamer and extends from the second vegetable steamer above to support the first vegetable steamer above the second vegetable steamer, wherein the support device further comprises releasable engagement means for connecting the first vegetable steamer to the pillar.

10. A combination as claimed in claim 9 wherein the pillar is formed in two parts which are telescopically connected.

11. A combination as claimed in claim 9 further comprising a handle member connected to the first steamer, the catch member being connected to a release button protruding from the handle member, the catch member being movable to a release position by actuation of the button.

12. A combination as claimed in claim 9 wherein the pillar is provided with a bore having a ledge and a catch member is connected to the first vegetable steamer, the catch member engaging the ledge in snap-fit engagement to connect the first and second vegetable steamers together.

13. A combination as claimed in claim 12 further comprising a handle member connected to the first steamer, the catch member being connected to a release button protruding from the handle member, the catch member being movable to a release position by actuation of the button.

14. A combination as claimed in claim 13 wherein the catch member includes at least one resiliently deformable leg, each of said leg being inwardly deformable by actuation of the push button to release the catch member from the leg of the pillar.

15. A combination as claimed in claim 9 wherein the releasable engagement means comprises a push button actuated catch member comprising first and second limbs resiliently biased to an engagement position, the limbs each having an inclined surface for engagement with a corresponding inclined surface of a reaction member, depression of the actuator forcing the inclined surfaces together to cause inward movement of the limbs to a release position and the pillar including a ledge having a central opening of a size to allow the limbs in the release position to pass therethrough but in the engagement position to be held thereby.

16. A combination as claimed in claim 15 wherein the limbs each have a barbed end.

* * * * *